United States Patent
Zheng et al.

(10) Patent No.: US 8,237,406 B2
(45) Date of Patent: Aug. 7, 2012

(54) BATTERY ARRAY VOLTAGE EQUALIZATION DEVICE

(75) Inventors: Qingfei Zheng, Shenzhen (CN);
 Xiangjun Dai, Shenzhen (CN);
 Yaozhong Mi, Shenzhen (CN); Aimei Zhou, Shenzhen (CN)

(73) Assignee: BYD Company Ltd., Shenzhen (CN)

( * ) Notice: Subject to any disclaimer, the term of this patent is extended or adjusted under 35 U.S.C. 154(b) by 376 days.

(21) Appl. No.: 12/555,744

(22) Filed: Sep. 8, 2009

(65) Prior Publication Data

US 2010/0109607 A1    May 6, 2010

(30) Foreign Application Priority Data

Oct. 31, 2008 (CN) .......................... 2008 2 0213223

(51) Int. Cl.
 *H02J 7/00* (2006.01)
(52) U.S. Cl. ......... 320/118; 324/434; 320/116; 320/117
(58) Field of Classification Search .......... 320/116–119; 324/426–434
See application file for complete search history.

(56) References Cited

U.S. PATENT DOCUMENTS

| | | | | |
|---|---|---|---|---|
| 5,982,142 A | * | 11/1999 | Sullivan et al. | 320/118 |
| 6,260,988 B1 | * | 7/2001 | Misawa et al. | 362/276 |
| 2005/0242776 A1 | * | 11/2005 | Emori et al. | 320/116 |
| 2008/0238432 A1 | * | 10/2008 | Botker et al. | 324/434 |
| 2008/0252257 A1 | * | 10/2008 | Sufrin-Disler et al. | 320/118 |

* cited by examiner

*Primary Examiner* — Samuel Berhanu
(74) *Attorney, Agent, or Firm* — Morgan, Lewis & Bockius LLP

(57) ABSTRACT

The present invention provides a battery array voltage equalization device comprising: a sampling unit which samples the battery voltage signals of the battery array according to a sampling control signal; an analog-to-digital converting unit which converts the sampled voltage signals into a digital voltage signal; a control unit which generates the sampling control signal and a driving signal based on the digital voltage signal; an equalization unit which equalizes the voltage signals of the battery array based on the driving signal; a filter unit which is connected to the equalization unit and the battery array. The present invention applies the filter unit to filter out the ripple signal generated during equalization.

11 Claims, 6 Drawing Sheets

BATTERY ARRAY VOLTAGE EQUALIZATION DEVICE

CROSS-REFERENCE TO RELATED APPLICATION

The present application claims priority to Chinese Patent Application No. 200820213223.6, filed on Oct. 31, 2008, the entirety of which is hereby incorporated by reference.

BACKGROUND OF THE INVENTION

1. Field of the Invention

The present invention relates to a field of battery technology, in particular to a battery array voltage equalization device.

2. Background of the Related Art

Batteries are normally serially-connected or connected in parallel in order to gain higher output voltage and larger power capacity to meet the requirements of load-driving. Because of the better performance-to-cost ratio, the rechargeable batteries have been widely used in various electric products, and also in automobiles. However, as limited by the processing condition, differences exist between every single cell. After multiple cycles of charging and discharging, voltage levels differ among the batteries. Thus, the effective capacity of the serially connected battery array decreases, which influences the performance and the lifespan of the battery array.

To solve this problem, researches have been done on the battery equalization methods. At present, one battery equalization circuit comprises a detecting circuit, a control unit and an energy dissipation circuit. The detecting circuit detects the voltage of the two electrodes of each battery and transmits the detected voltage signals to the control unit. The control unit compares the detected voltage signals and finds out the lowest voltage in the detected voltages signals. Based on the lowest voltage signal, the control unit controls the energy dissipation circuit to discharge the batteries whose voltage levels are higher than the lowest voltage value, therefore equalizing the battery voltages in a battery array. In such an equalization scheme, the energy dissipation unit works constantly, therefore the batteries stay in a status of charging or discharging, which influences the capacity of each battery. Meanwhile, the energy dissipation circuit generates ripple wave which causes fluctuation in the battery voltage.

SUMMARY OF THE INVENTION

The present invention is provided to solve the existing problem in that the equalization device generates ripple wave which influences the stability of the battery voltage. To solve the above technical problem, a battery array voltage equalization device comprising: a sampling unit which samples the voltage signals of the battery array based on a sampling control signal, an analog-to-digital converting unit which converts the sampled voltage signal into a digital voltage signal, a control unit which generates the sampling control signal and further generates a driving signal based on the digital voltage signal, an equalization unit which equalizes the voltage signals of the battery array based on the driving signal, and a filter unit which is connected to the equalization unit and the battery array.

In the present invention, the control unit controls the sampling unit to sample the voltage signals of the battery array, and further controls the equalization unit to equalize the battery voltages based on the sampled results. Further, the present invention applies the filter unit to filter out the ripple signal generated in the process of equalization, thus diminishing the influences to the battery voltage.

DETAILED DESCRIPTION OF THE EMBODIMENTS

Hereinafter, the embodiments of the present invention will be described in detail with reference to the accompanying drawings.

Figure 1:
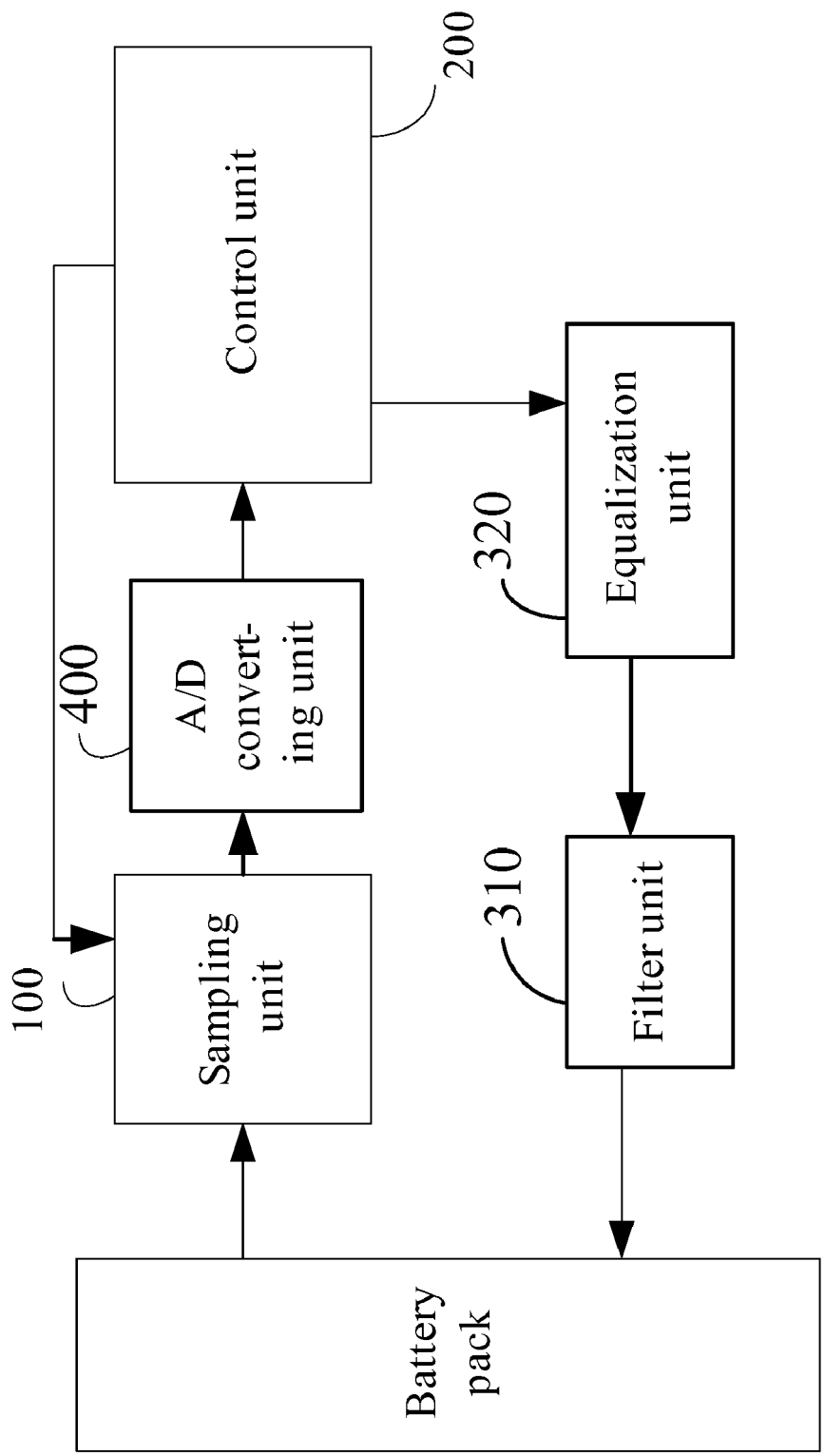
FIG. 1 is a structure diagram of one embodiment in the present invention.

The present invention provides a battery array voltage equalization device comprising: a plurality of serially-connected batteries, wherein each battery has a positive electrode and a negative electrode. Referring to FIG. 1, the battery array voltage equalization device comprises a sampling unit 100 which samples the voltage signals of the battery array based on a sampling control signal, an analog-to-digital converting unit 400 which converts the sampled voltage signal into a digital voltage signal, a control unit 200 which generates the sampling control signal and further generates a driving signal based on the digital voltage signal, an equalization unit 320 which equalizes the voltage signals of the battery array based on the driving signal, and a filter unit 310 which is connected to the equalization unit and the battery array.

In the present invention, the control unit 200 controls sampling unit 100 to sample the battery voltage signals. The sampling unit 100 further transmits the voltage signals to the analog-to-digital converting unit 400. The analog-to-digital converting unit 400 coverts the voltage signal into a digital voltage signal and transmits to control unit 200. The control unit 200 then equalizes the voltage signals of the battery array based on the digital voltage signal. Because the present invention applies the filter unit 310 to filter out the ripple signal generated in the process of equalization, the influence to the battery voltages in the battery array is diminished.

Figure 2:
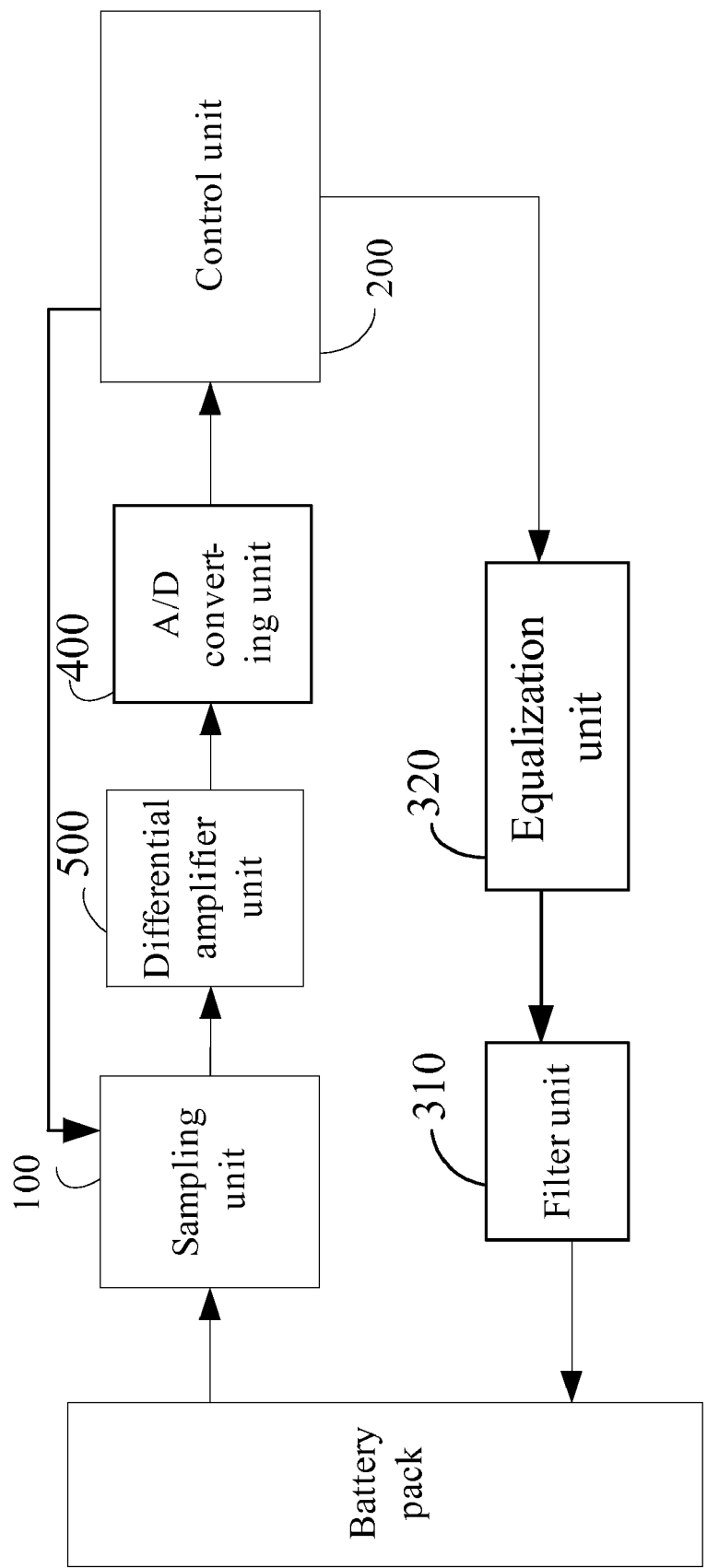
FIG. 2 is a structure diagram of another embodiment in the present invention.

FIG. 2 shows another embodiment of the present invention, wherein the battery array voltage equalization device further comprises: a sampling unit 100, a control unit 200, an analog-to-digital converting unit 400, a filter unit 310, an equalization unit 320, and a differential amplifier unit 500, wherein the input of the differential amplifier unit 500 is connected to the sampling unit 100, and the output of the differential amplifier unit 500 is connected to the analog-to-digital converting unit 400. The connection of the rest parts of the battery array equalization circuit has been described before and will not be repeated herein.

The differential amplifier unit 500 of the present embodiment performs differential amplification to the sampled voltage signals, which improves the accuracy of the battery voltage sampling and the equalization. Therefore, the battery lifespan can be prolonged.

Figure 3:
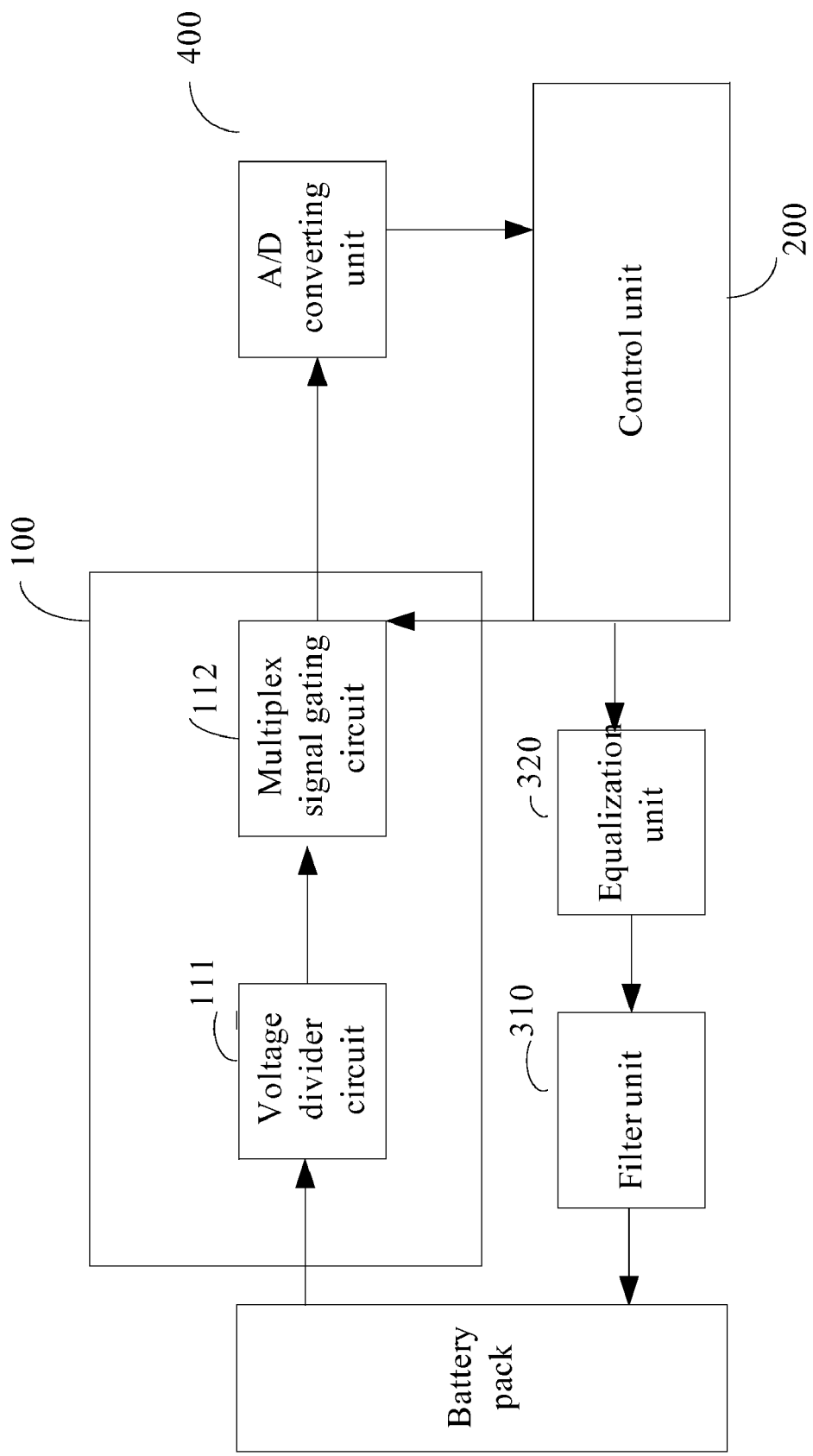
FIG. 3 is a structure diagram of yet another embodiment in the present invention.

FIG. 3 shows another embodiment of the present invention, wherein the analog-to-digital converting unit 400 is an A/D converting unit. A battery array equalization device in the present embodiment comprises: a sampling unit 100, a control unit 200, an A/D converting unit 400, a filter unit 310 and an equalization unit 320. Said sampling unit 100 comprises a multiplex signal gating circuit 112 and a voltage divider circuit 111. Said voltage divider circuit 111 comprises an output. Said multiplex signal gating circuit comprises a control end, an output and an input. Said control unit 200 is connected to the multiplex signal gating circuit 112 via a receiver end of the sampling unit to control the signal gating. Said input of the multiplex signal gating circuit is connected to the output of the voltage divider circuit. The voltage divider circuit is further connected to the battery array. The outputs of the multiplex signal gating circuits output the sampled voltage signals. Said voltage divider circuit 111 is connected to the battery array, wherein the connecting part is a sampling end.

The connection of the rest parts of the battery array equalization circuit has been described before and will not be repeated herein.

Said A/D converting unit 400 comprises I2C bus interfaces or SMBus bus interferences. A/D converting unit 400 is connected to the control unit 200 via the I2C bus interface or the SMBus bus interface, and transmits the digital voltage signals to the control unit 200. In some embodiment, the A/D converting unit 400 comprises I2C bus interfaces.

Figure 4:
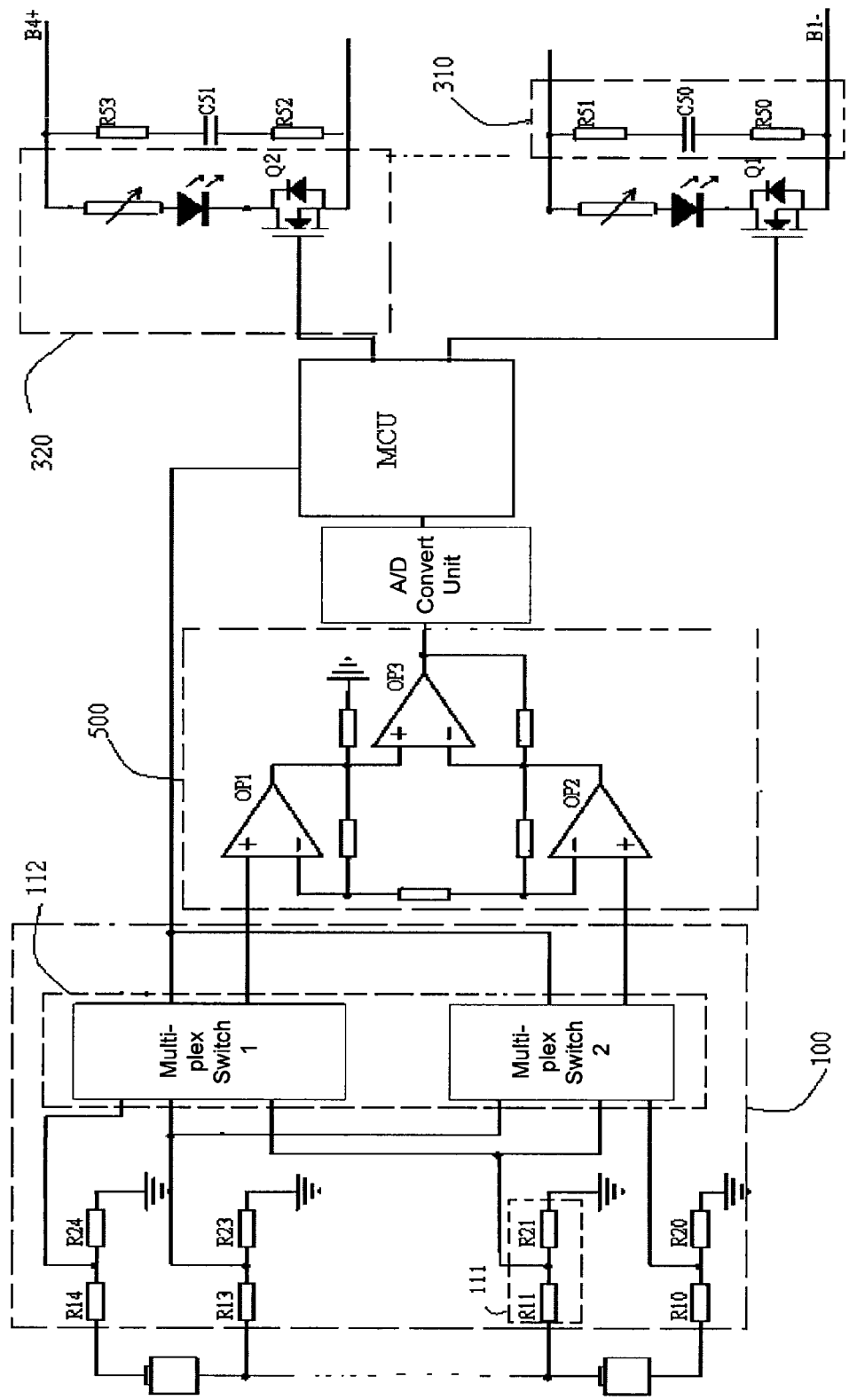
FIG. 4 is a circuit diagram of one embodiment in the present invention.

FIG. 4 shows yet another embodiment in the present invention, wherein the battery array voltage equalization device further comprising: a sampling unit 100, a differential amplifier unit 500, a control unit 200, an A/D converting unit 400, a filter unit 310 and an equalization unit 320. Said sampling unit 100 comprises a multiplex signal gating circuit 112 and a plurality of voltage divider circuits 111. Said control unit 200 is connected to the multiplex signal gating circuit 112 via a receiver end of the sampling unit to control the signal gating.

Said sampling unit 100 comprises a plurality of voltage divider circuits 111, wherein the structure of each voltage divider circuit is the same. The electric connections of one single voltage divider circuit will be described herein. Said voltage divider circuits 111 comprises a third resistor and a forth resistor serially connected. One end of the voltage divider circuit 111 is connected to the positive electrode or the negative electrode of the battery, and the other end is connected to the ground. In such a way, if N (more than 1) batteries need to be sampled, N+1 voltage divider circuits are needed. The connecting portion of the third and the forth resistors is then connected to the multiplex signal gating circuit 112 as the output of the voltage divider circuit 111. Said multiplex signal gating circuit 112 comprises a first multiplex switch and a second multiplex switch connected in parallel, wherein the first multiplex switch and the second multiplex switch are controlled by the control unit 200. Each multiplex switch comprises a plurality of inputs and an output. The voltage divider circuit 111 connected to the positive electrode of a battery is connected to the input of the second multiplex switch. The outputs of the two multiplex switches are connected to the inputs of the differential amplifier unit 500, respectively.

The connecting port of said voltage divider circuit 111 connecting to the battery is a sampling end of the sampling unit. The control ends of the first and the second multiplex switches are the receiving ends to receive the sampling control signal. The control unit 200 transmits the control signal to the first and the second multiplex switches to sample each battery. Through the voltage divider circuit, the voltage signal which reaches the differential amplifier unit 500 is lower than the original sampled value. Thus, distortion caused by the differential amplifier unit 500 due to a high voltage signal will not appear. The use of the differential amplifier unit 500 in the battery array voltage equalization device improves the sampling accuracy and reduces the fault equalization operations due to the inaccurate sampling. Further, it prolongs the battery lifespan and maintains the battery capacity. The circuit of the differential amplifier unit 500 is known to the art and will not be repeated herein.

In some embodiment, said control unit 200 is a single chip computer or a microcontroller (MCU). In the present embodiment, MCU is selected as the control unit 200.

Further, said equalization units 320 correspond to the filter units 310, respectively. The amount of the equalization units 320 is equal to the amount of the batteries in the battery array.

The present embodiment comprises a plurality of equalization units 320 and a plurality of filter units 310. Herein, one equalization unit 320 and one filter unit 310 are described in detail. Specifically, the filter unit 310 and the equalization unit 320 configured at both ends (B1−, B1+) of the first battery are described below.

Further, said filter unit 310 is a low-pass filter comprising: a first resistor R50, a second resistor R51 and a first capacitor C50, wherein the first resistor R50, the second resistor R51 and the first capacitor C50 are serially-connected. The serially connected circuit is then connected to the positive and the negative electrodes of the corresponding battery in parallel to filter out the high frequency interference signal generated in the equalization process.

In some embodiment, said low-pass filter circuit is configured as follows: one end of a resistance is connected to the positive electrode of the battery; one end of another resistance is connected to the negative electrode of the battery; and the two electrodes of the capacitor are connected to the rest two ends of the two resistances, respectively.

The low-pass filter configured with the resistances and the capacitors filters out the high frequency interference signal generated in the equalization process, and stabilizes the voltages between the two electrodes of the battery. Therefore, ripple waves do not appear. Furthermore, the influence of the equalization unit over the battery voltage is eliminated.

Said equalization unit further comprises switch components and energy dissipation circuits, wherein the control ports of said switch components are connected to the control unit (MCU). The first end of a switch component is connected to the corresponding positive electrode or the negative electrode of the battery via the energy dissipation circuit; and the second end of the switch component is connected to the rest electrode of the battery. Said switch component is one of a field effect transistor, a triode or a silicon controlled rectifier. In some embodiment, said switch component is an MOS transistor. Said energy dissipation circuit comprises a variable resistor and a light emitting diode, wherein said variable resistor is serially connected to the light emitting diode.

As the amounts of the equalization units equals to the amount of the batteries in the battery array, and one equalization unit corresponds to one battery, it can be determined that which battery is under equalizing based on the on/off status of an emitting diode.

Further, the driving signal of said control unit 200 used to control the equalization unit is defined as a high level voltage triggered by the control unit 200 when the received digital voltage signal sent by the A/D converting unit 400 is greater than a predetermined value, or a low level voltage triggered by the control unit 200 when the received digital voltage signal sent by the A/D converting unit 400 is lower than the predetermined value.

Said predetermined value is obtained from the battery charging characteristic curve, as shown in FIG. 4. Said predetermined value is the voltage chosen when the battery characteristic curve is smooth and stable. For example, if V is selected as the threshold value of the equalization voltage, measure the threshold value and it will be equal to the sampled value of the battery which has voltage V by the sampling unit. According to the above described circuit, the predetermined value can be calculated by those who skilled in the art, thus detailed description will be omitted herein.

By setting a certain equalization voltage, the equalization circuit only works when the voltage of the battery reaches the predetermined value. As a result, the operation frequencies of the equalization process are reduced, i.e., the battery charging and discharging frequencies are reduced. Therefore, is helps to prolong the battery life span and maintain the battery capacity.

Figure 5:
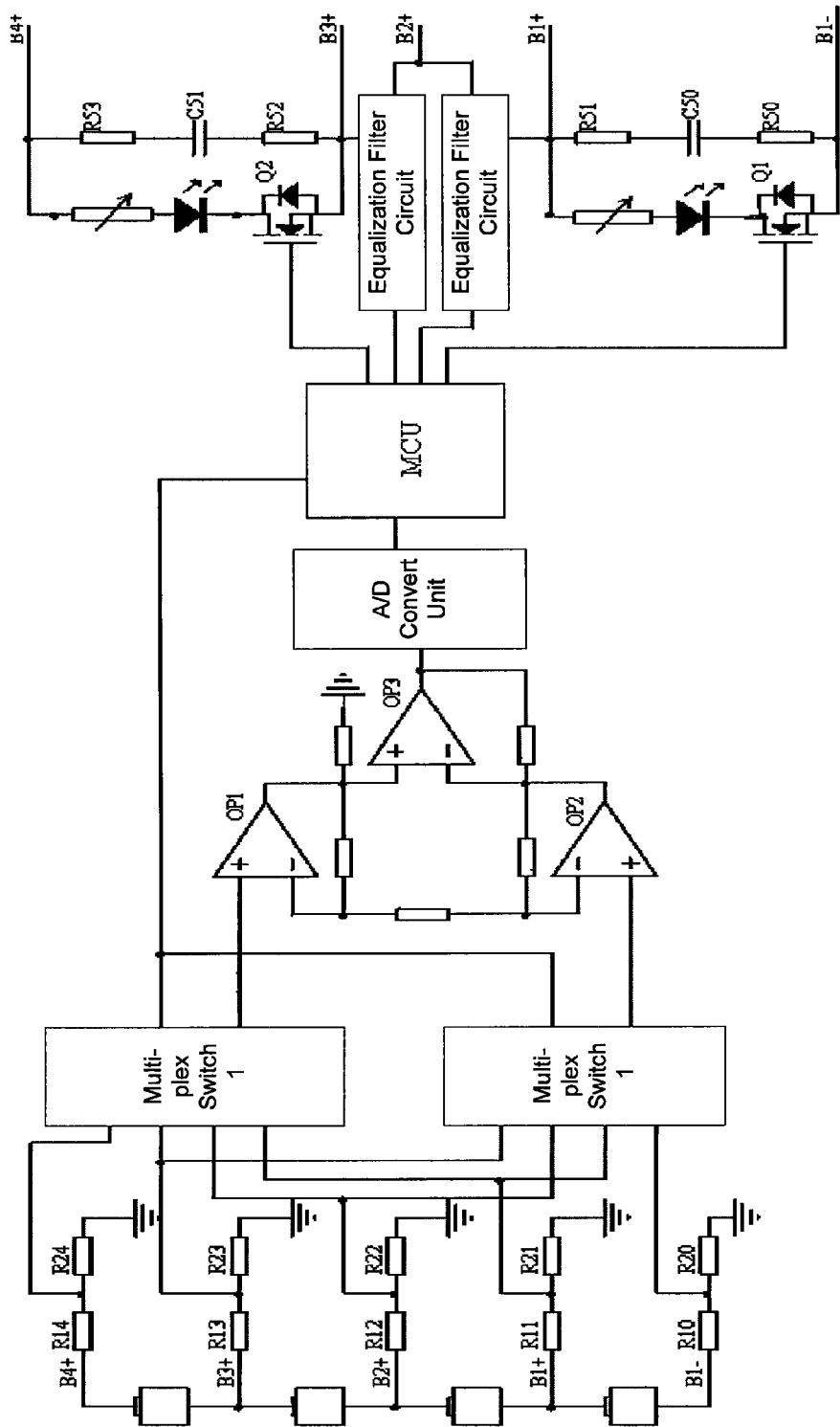
FIG. 5 is a circuit diagram of another embodiment in the present invention.

The technical scheme and principles of the present invention are further described herein with reference to FIG. 5.

The battery array in the present embodiment comprises four batteries. Said batteries are serially-connected. There are five connecting terminals from the negative electrode of the first battery to the positive electrode of the forth battery. These connecting terminals are called sampling terminals B1−, B1+, B2+, B3+, B4+, respectively. A battery voltage equalization device in the present embodiment comprising: a sampling unit, a differential amplifier unit, an AD converting unit, an MCU, an equalization unit and a filter unit, wherein each unit and the related connection are described herein below.

With respect to the sampling unit, the differential amplifier unit, and the AD converting unit:

Each sampling end is connected to a voltage divider circuit, wherein the structure of each voltage divider circuit is the same.

The voltage divider circuit which is connected to the battery positive electrode is connected to the input of a multiplex switch 1, and the voltage divider circuit which is connected to the negative electrode of the battery is connected to the input of a multiplex switch 2. The outputs of the multiplex switch 1 are connected to the inputs of a calculation amplifier op1 configured in the differential amplifier unit. The outputs of the multiplex switch 2 are connected to the inputs of a calculation amplifier op2 configured in the differential amplifier unit.

The voltage divider circuit which is connected to B1 end is described herein as an example, wherein said voltage divider circuit comprises a third resistor R10 and a forth resistor R20. Resistance R10 is connected to resistance R20 in serial, another end of resistance R10 is connected to B1 end, and another end of R20 is connected to the ground. The connecting portion of the third resistor R10 and the forth resistor R20 is connected to the multiplex switch 2. In this embodiment, the voltage reaching the multiplex switch after passing through the divider circuit is lower.

The control terminals of the multiplex switch 1 and the multiplex switch 2 are connected to MCU, wherein MCU controls the voltage samplings of the battery. Said differential amplifier unit receives the voltage signals and performs differential calculation to said voltage signal. The calculated result will be outputted to the A/D converting unit via a calculation amplifier op3. The A/D converting unit converts the analog signal into a digital voltage signal and transmits to MCU via the 12C bus.

With respect to the equalization unit and the filter unit:

The equalization device in the present embodiment comprises four equalization units and four filter units. One equalization unit and one filter unit will be described herein. Specifically, the equalization unit and the filter unit at the two ends (B1−,B1+) of the first battery are described herein below.

Said filter unit is a low pass filter comprising: a first resistor R50, a second resistor R51 and a first capacitor C50, wherein one terminal of resistance R50 is connected to the positive electrode of the battery; one terminal of resistance R51 is connected to the negative electrode of the battery; and the two electrodes of said capacitor C50 are connected to the rest two terminals of the above two resistances, respectively.

The low pass filter configured with the resistance and the capacitor filters out the high frequency signals generated in the equalization process so as to stabilize the voltage between the two electrodes of the battery, thus the ripple wave will not appear. Accordingly, the influence of the equalization unit to the battery voltage is eliminated.

Said equalization unit comprises an MOS transistor and an energy dissipation circuit, wherein a control gate of said MOS transistor is connected to MCU; the source electrode of the MOS transistor is connected to one end of the serially connected filter circuit; the drain electrode of the MOS transistor is connected to one end of the energy dissipation circuit; and another end of the energy dissipation circuit is connected to the rest end of the serially connected filter circuit. Said energy dissipation circuit comprises a variable resistor R41 and a light emitting diode LED1, wherein said variable resistor R41 is connected to the light emitting diode LED1 in serial.

As the amounts of the equalization units equals to the amount of the batteries in the battery array, and one equalization unit corresponds to one battery, it can be determined that which battery is under equalizing based on the on/off status of an emitting diode.

Further, the driving signal of said MCU control unit is a high level voltage triggered by said MCU when the received digital voltage signal sent by the sampling unit is greater than V2, or is a low level voltage triggered by said MCU when the received digital voltage signal sent by the sampling unit is lower than V2.

Figure 6:
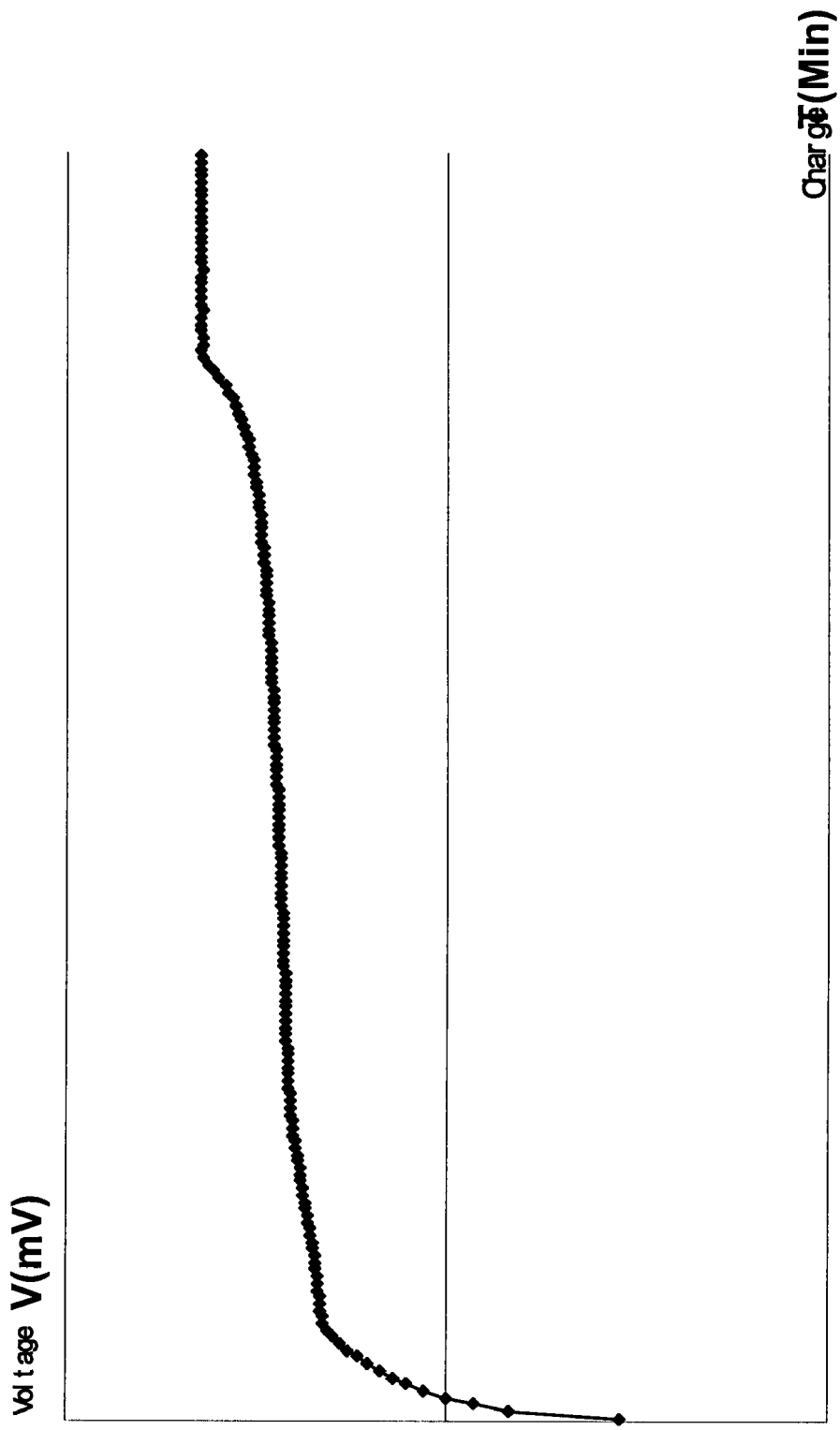
FIG. 6 is a charging characteristic curve of one embodiment in the present invention.

Said predetermined value is obtained from the battery charging characteristic curve, as shown in FIG. 6. Said predetermined value is the voltage chosen when the battery characteristic curve is smooth and stable. For example, if V is selected as the threshold of the equalization voltage, measure said threshold and it will be equal to the sampled value V2 which is sampled by the sampling unit from the battery of the voltage V. According to the above described circuit, V2 can be calculated by those who skilled in the art, thus detailed description will be omitted herein.

The A/D converting unit receives the voltage analog signals outputted by the output terminal 1 of OP3, converts said analog signals into digital voltage signals, and transmits to MCU via the 12C bus. MCU compares the received data with the predetermined value. If the value of the received data is greater than the predetermined value, MCU triggers a high level voltage to the grid of the MOS transistor, thus the MOS transistor is conducted. Therefore, the energy dissipation circuit and the light emitting diode are turned on to operate. Otherwise, the energy dissipation MOS transistor will not be conducted and the energy dissipation circuit will not operate.

In this embodiment, the present invention ensures accurate sampling and reduces the influence of the equalization device to the battery voltage. Furthermore, the equalization unit performs equalization only when battery voltage reaches a certain value.

The above embodiments explain only several implement methods. Although it includes detailed and specific descriptions, it can not be understood as a restriction of the protection scope of the present invention. It should be known that, multiple modifications or improvements can be made by those who skilled in the art without isolating from the conception of the present invention, and those are all within the protection scope of the present disclosure. The protection scope shall be considered by the claims.

What is claimed is:

1. A battery array voltage equalization device comprising:
   a plurality of serially-connected batteries, wherein each battery has a positive electrode and a negative electrode;
   a sampling unit coupled to the battery array for sampling the voltage signals of the battery array;
   an analog-to-digital converting unit coupled to the sampling unit for converting the sampled voltage signals into a digital voltage signal;
   a control unit coupled to the analog-to-digital converting unit for generating a sampling control signal to control the sampling unit and a driving signal based on the digital voltage signal;
   an equalization unit for generating an equalization signal for equalizing the voltage signal of the battery array based on the driving signal; and
   a filter unit coupled to the equalization unit for applying the equalization signal to the battery array,
   wherein the equalization unit includes multiple pairs of switch component and energy dissipation circuit, each pair of switch component and energy dissipation circuit for controlling the voltage of a respective battery and the switch component further including a first output terminal, a second output terminal, and one or more controlling ports;
   wherein the controlling ports of the switch component are coupled to the control unit, and the first output terminal of the switch component is coupled to the positive electrode of the respective battery through the energy dissipation circuit and the second output terminal of the switch component is coupled to the negative electrode of the respective battery.

2. The battery array voltage equalization device in claim 1, further comprises a differential amplifier unit for performing differential amplification to the sampled voltage signals; wherein the input of the differential amplifier unit is connected to the output of the sampling unit; and the output of the differential amplifier unit is connected to the input of the analog-to-digital converting unit.

3. The battery array voltage equalization device in claim 1, wherein the sampling unit includes a multiplex signal gating circuit and a plurality of voltage divider circuits coupled to the multiplex signal gating circuit, wherein each voltage divider circuit includes an output terminal; and
   the multiplex signal gating circuit includes a control terminal, an output terminal and a plurality of input terminals;
   the control unit is coupled to the control terminal of the multiplex signal gating circuit to control the signal gating;
   the plurality of input terminals of the multiplex signal gating circuit are connected to the output terminals of the plurality of voltage divider circuits, respectively; and
   the output terminal of the multiplex signal gating circuit outputs the sampled voltage signals to the analog-to-digital converting unit.

4. The battery array voltage equalization device in claim 1, wherein the filter unit is a low-pass filter including a first resistor, a second resistor and a first capacitor;
   wherein the first resistor, the second resistor and the first capacitor are serially-connected to form a circuit, which is connected in parallel with a respective battery in the battery array.

5. The battery array voltage equalization device in claim 3, wherein said voltage divider circuit includes a third resistor and a forth resistor serially connected to form a circuit having first and second ends;
   wherein the first end of the voltage divider circuit is connected to the positive electrode of the battery array, and the second end of the voltage divider circuit is connected to the ground; and
   the junction of the third resistor and the forth resistor is configured as an output of the voltage divider circuit, and is connected to a respective input terminal of the multiplex signal gating circuit.

6. The battery array voltage equalization device in claim 3, wherein the multiplex signal gating circuit includes a first multiplex switch and a second multiplex switch;
   wherein the first multiplex switch and the second multiplex switch are connected in parallel and are controlled by the control unit;
   each multiplex switch includes a plurality of input terminals and an output terminal for outputting the sampled signal;
   the output terminal of a respective voltage divider circuit connecting to the positive electrode of a respective battery in the battery array is connected to a respective input terminal of the first multiplex switch; and
   the output of a respective voltage divider circuit connecting to the negative electrode of a respective battery in the battery array is connected to a respective input terminal of the second multiplex switch.

7. The battery array voltage equalization device in claim 1, wherein the analog-to-digital converting unit includes one bus interface selected from the group consisting of an I2C bus interface and an SMBus bus interface.

8. The battery array voltage equalization device in claim 1, wherein the switch component is one selected from the group consisting of a field effect transistor, a triode or a silicon controlled rectifier;
   wherein at least one of the controlling port of the switch component is connected to the control unit.

9. The battery array voltage equalization device in claim 1, wherein the energy dissipation circuit comprises a variable resistor and an LED serially connected with the variable resistor.

10. The battery array voltage equalization device in claim 1, wherein the filter unit includes a plurality of low-pass filter circuits, each low-pass filter circuit being connected in parallel to a respective pair of switch component and energy dissipation circuit and including a first resistor, a second resistor and a first capacitor, and each of the first and second resistors has a first end a second end, respectively, and the first end of the first resistor is connected to the positive electrode of the respective battery and the second end of the second resistor is connected to the negative electrode of the respective battery, and the first capacitor has a pair of electrodes that are connected to the second end of the first resistor and the first end of the second resistor, respectively.

11. The battery array voltage equalization device in claim 1, wherein, in response to a voltage signal sampled at a respective battery that is higher than a predetermined value, the control unit is configured to apply a high-level voltage to at least one controlling port of a switch component to turn on the corresponding energy dissipation circuit in the same pair to lower the voltage of the respective battery.

* * * * *

UNITED STATES PATENT AND TRADEMARK OFFICE
CERTIFICATE OF CORRECTION

| | | |
|---|---|---|
| PATENT NO. | : 8,237,406 B2 | Page 1 of 1 |
| APPLICATION NO. | : 12/555744 | |
| DATED | : August 7, 2012 | |
| INVENTOR(S) | : Zheng et al. | |

It is certified that error appears in the above-identified patent and that said Letters Patent is hereby corrected as shown below:

In Column 8, line 3, please delete "forth" and add -- fourth --;

In Column 8, line 9, please delete "forth" and add -- fourth --.

Signed and Sealed this
Twenty-fifth Day of September, 2012

David J. Kappos
*Director of the United States Patent and Trademark Office*